Sept. 10, 1968   P. J. LISTER ET AL   3,400,427
HOSE CURING UNIT
Original Filed March 2, 1964

INVENTORS
PAUL J. LISTER
ALEXANDER KRYNYTZKY
BY Joseph Januszkiewicz
ATTY.

United States Patent Office 3,400,427
Patented Sept. 10, 1968

3,400,427
HOSE CURING UNIT
Paul J. Lister, Akron, Ohio, and Alexander Krynytzky, Buffalo, N.Y., assignor to The B. F. Goodrich Company, New York, N.Y., a corporation of New York
Original application Mar. 2, 1964, Ser. No. 348,629, now Patent No. 3,241,181, dated Mar. 22, 1966. Divided and this application Sept. 8, 1966, Ser. No. 577,963
6 Claims. (Cl. 18—6)

This invention relates to a hose curing apparatus and more particularly to a chuck for a hose curing apparatus. This application is a division of application Ser. No. 348,629, filed Mar. 2, 1964, now Patent No. 3,241,181.

In the manufacture of tubular products such as fire hose, a rubber tube is encased in one or more plies of fabric. In the case of fire hose, the fabric tubing and the rubber tubing are prepared separately, after which the rubber tubing is inserted into the fabric tubing and thereafter vulcanized or cured as a unit. During the curing operation, a curing fluid such as steam under pressure is admitted to the rubber tubing through a linearly movable chuck which expands the rubber tubing and fabric tubing into engagement with a mold which confines the lateral expansion into an oblong shape while simultaneously permitting longitudinal expansion.

The present invention relates to a novel chuck means which clamps the respective end portions of the hose, which chuck means are moved linearly in the direction of length of the hose which subjects the hose to tensioning during the curing operation. The present invention is concerned with the novel means for chucking the end of a hose, tensioning such hose while permitting the introduction of fluid therein.

An object of this invention is to provide a new and improved chuck and work-holding means for hose in their curing process.

A further object of this invention is to provide a novel chucking means which accommodates various sizes of hoses.

With these and other objects in view, as will hereinafter more fully appear, and which will be more particularly pointed out in the appended claims, reference is now made to the following description taken in connection with the accompanying drawings in which:

FIG. 4 is a front elevational view of the chuck unit.

Figure 1:
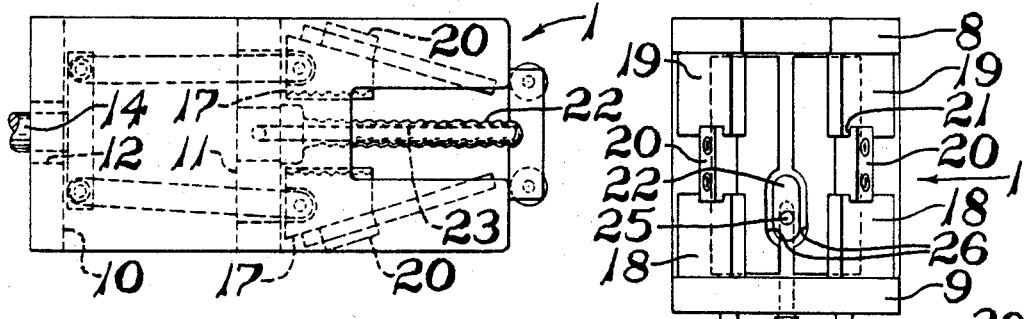
FIG. 1 is a plan view of the chuck unit showing the jaws in open position.
Figure 2:
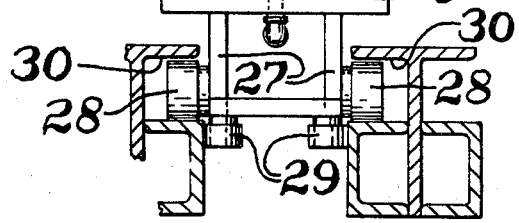
FIG. 2 is a side elevational view of the chuck unit.
Figure 2:
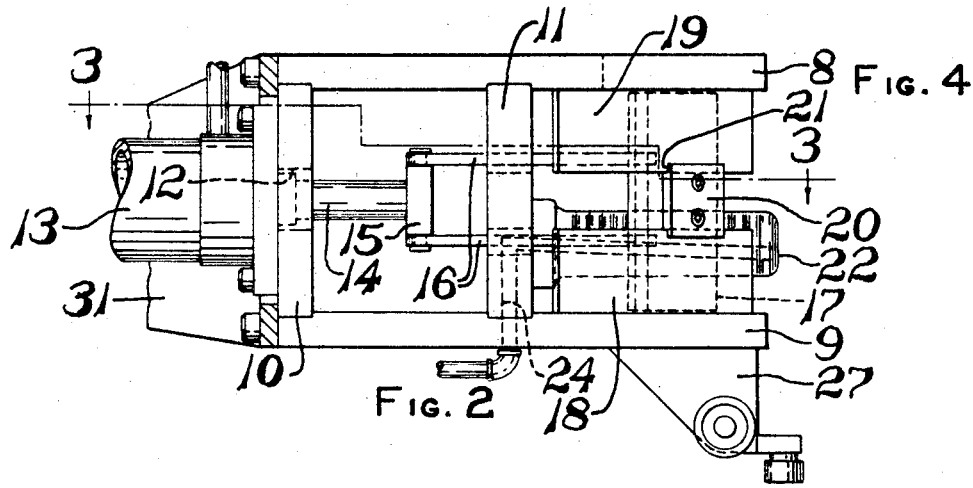
Figure 3:
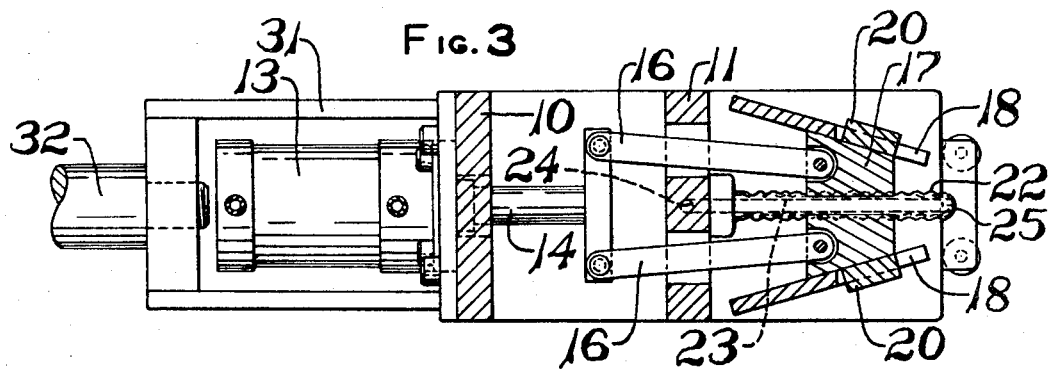
FIG. 3 is a plan view partly in cross section of the chuck unit taken on line 3—3 of FIG. 2.

Referring to FIGS. 1 and 2, there is shown a chuck 1 having an upper and lower plate 8 and 9 respectively connected by spaced cross plates 10 and 11. Cross plate 10 has a central bore 12 (FIG. 1). An air cylinder 13 is suitably connected to plate 10, with a rod 14 of air cylinder 13 extending through the central bore 12. The rod 14 has its outer end portion connected to a bracket 15, which bracket 15 pivotally supports one end of links 16. The other ends of links 16 are pivotally connected to a pair of movable jaw blocks 17. The links 16 extend through suitable slots in plate 11. Lower plate 9 has a pair of vertically extending spaced guideways 18 which as viewed in FIG. 3 converge toward the front end portion of the chuck 1 for a purpose to be described. Upper plate 8 has a pair of depending spaced guideways 19 in alignment with the converging guideways 18. Each jaw block 17 has a guide member 20 mounted on its outer side wall (FIGS. 1 and 2). Each guide member 20 is recessed as at 21 to define a groove between the outer wall of each jaw block 17 and the adjacent recessed wall surface of the associated guide member 20 to thereby guide the respective jaw blocks 17 to work gripping engagement upon movement of the respective jaw blocks 17 towards the forward portion of the chuck 1. Pressurization of the head end of air cylinder 13 extends the rod 14 rightward as viewed in FIG. 1 to thereby move the respective jaw blocks 17 and their associated guide members 20 rightwardly to the position shown in FIG. 3 via links 16. Cross plate 11 has an elongated serrated projection 22 mounted centrally thereon. Projection 22 is oblong in cross section and has a bore 23 extending longitudinally therethrough which bore 23 has one end communicating with a conduit 24 in chuck 1 via which condensate or steam may flow. The other end of bore 23 communicates with an opening 25 (FIG. 3), which opening 25 is adapted to communicate with the bore of a hose clamped in chuck 1. As seen in FIG. 4, the respective jaw blocks 17 are arcuately recessed as at 26, which recessed portion is serrated to cooperate with the serrated projection 22 to clamp the hose wall therebetween. Lower plate 9 has a pair of spaced depending brackets 27 (FIG. 4) which support rotatable wheels 28, 28 and wheels 29, 29. As seen in FIG. 4, the wheels 28 ride in grooves 30 formed in the framework of the table on which such chuck is reciprocated while wheels 29 guide the chucks 1 in their longitudinal movement on such table.

The chuck 1 is connected via connecting members 31 to a piston rod 32 (FIG. 3) of a hydraulic cylinder, not shown, which is adapted to stretch the hose during the process as fully explained in the above-identified co-pending application.

In the operation of the chucking apparatus pressurization of the rod end of air cylinder 13 associated with chucks 1 retracts piston rod 14 and simultaneously therewith moves links 16 leftwardly (as viewed in FIG. 3) therewith along with jaw blocks 17. Guideways 18 direct the outward and backward movement of jaw blocks 17 in cooperation with the guide members 20 whereby the serrated arcuate recesses 26 on the jaw block 17 move away from the respective side portions of serrated projection 22 substantially to the position shown in FIG. 1. One end of a hose is then inserted over projection 22. Pressurization of the head end of air cylinder 13 via a suitable control valve directs pressurized fluid from a pressure source to such head end of cylinder 13 and operates to move the piston rod 14 rightwardly as viewed in FIG. 1 to thereby move the respective jaw block 17 and guide members 20 inwardly toward each other via the converging guideways 18 to the position shown in FIG. 3. Such rightward movement of jaw blocks 17 moves the respective serrated recesses 26 into clamping engagement with the end portion of a hose in cooperation with the serrated projection 22. The other end portion of the hose is inserted into a similar chuck on the other end portion of the apparatus and clamped thereto in the same manner as described above in the clamping action of chuck 1. With the respective ends of the hose securely held by the chucks the hose is stretched to the full length via movement of the chucks in a longitudinal direction away from each other. Steam is introduced via conduit 24 to cure the hose into a finished product. The arcuately shaped contouring on the respective jaw blocks 17 facilitates the accommodation of various diameters or sizes of hose without requiring a different size projection 22 thereby increasing the efficiency of the apparatus.

Other modifications are contemplated and may obviously be resorted to by those skilled in the art without departing from the spirit and scope of the invention, as hereinafter defined by the appended claims.

We claim:
1. A holding device for use in vulcanizing hose comprising a support, said support having an elongated projection having a longitudinal center line, at least a pair of guide means on said support converging toward one end of said support, work engaging means slidably mounted on each of said guide means for reciprocable movement thereon, and means mounted on said support operatively connected to said work engaging means for moving said work engaging means into work clamping engagement in cooperation with said projection.

2. A holding device as set forth in claim 1 wherein said projection has a bore extending therethrough communicating with an opening at the lower portion thereof.

3. A holding device as set forth in claim 2 wherein said projection is convex in cross section complementary to the arcuately shaped recesses on said work engaging means to receive and accommodate hoses of various sizes in diameter.

4. A holding device as set forth in claim 2 wherein each of said work engaging means has a recess whose surface is serrated and said recessed serrated surfaces cooperate with said projection to hold a hose adapted to be inserted over said projection upon actuation of said moving means.

5. A holding device as set forth in claim 4 wherein said projection has a serrated surface.

6. A holding device for use in vulcanizing hose comprising a support with a vertically disposed bracket, a horizontally extending mandrel mounted on said bracket, having one end portion terminating adjacent one end of said support, said mandrel having a serrated surface and a bore extending longitudinally therethrough terminating into an opening at said one end portion, said opening being at the lower end of said mandrel, a conduit in said bracket communicating with said bore for conducting fluid thereto or away therefrom, guide means mounted on opposite sides of said mandrel converging from said bracket toward said mandrel adjacent said one end of said support, work engaging jaws slidably mounted on said guide means for movement toward and away from said mandrel, means on said support operatively connected to said jaws for simultaneously reciprocating said jaws forwardly and rearwardly on said guide means, and inserts mounted on each of said jaws having concave serrated surfaces for cooperation with said serrated mandrel to grip a tubular work piece.

References Cited
UNITED STATES PATENTS

| | | | |
|---|---|---|---|
| 553,877 | 2/1896 | Stowe | 18—6 |
| 1,213,574 | 1/1917 | Baash. | |

ROBERT C. RIORDON, *Primary Examiner.*

D. R. MELTON, *Assistant Examiner.*